United States Patent
de Jong et al.

(10) Patent No.: US 11,989,537 B2
(45) Date of Patent: May 21, 2024

(54) DATAFLOW-BASED COMPUTER PROGRAM VISUALIZATION AND REFACTORING

(71) Applicant: Xilinx, Inc., San Jose, CA (US)

(72) Inventors: Maurits Maarten de Jong, Cologne (DE); Liam Fitzpatrick, Limburg (NL); Matthias Gehre, Cologne (DE); Maximilian Odendahl, Cologne (DE); Benoit Pradelle, Cologne (DE); Stefan Schuermans, Aachen (DE); Luis Gabriel Murillo Gómez, Aachen (DE)

(73) Assignee: Xilinx, Inc., San Jose, CA (US)

( * ) Notice: Subject to any disclaimer, the term of this patent is extended or adjusted under 35 U.S.C. 154(b) by 107 days.

(21) Appl. No.: 17/806,225

(22) Filed: Jun. 9, 2022

(65) Prior Publication Data
US 2023/0401043 A1    Dec. 14, 2023

(51) Int. Cl.
*G06F 8/41*       (2018.01)
*G06F 8/77*       (2018.01)
*G06F 11/34*      (2006.01)
*G06F 16/901*     (2019.01)

(52) U.S. Cl.
CPC ............... *G06F 8/433* (2013.01); *G06F 8/77* (2013.01); *G06F 11/3466* (2013.01); *G06F 16/9024* (2019.01)

(58) Field of Classification Search
CPC .............................. G06F 8/433; G06F 16/9094
USPC .................................................. 717/120–178
See application file for complete search history.

(56) References Cited

U.S. PATENT DOCUMENTS

| | | | |
|---|---|---|---|
| 8,601,458 B2* | 12/2013 | Andrade | G06F 8/44 |
| | | | 717/155 |
| 10,802,945 B2* | 10/2020 | Rozenberg | G06F 11/3612 |
| 11,074,107 B1* | 7/2021 | Nandakumar | G06F 8/10 |
| 11,422,797 B1* | 8/2022 | Zhang | G06F 8/72 |
| 11,455,229 B2* | 9/2022 | Rozenberg | G06F 8/71 |
| 2019/0079740 A1* | 3/2019 | Sharma | G06F 8/31 |
| 2022/0138004 A1* | 5/2022 | Nandakumar | G06N 20/00 |
| | | | 718/102 |

OTHER PUBLICATIONS

Henley, Austin Z., and Scott D. Fleming. "Yestercode: Improving code-change support in visual dataflow programming environments." 2016 IEEE Symposium on Visual Languages and Human-Centric Computing (VL/HCC). IEEE, 2016.pp. 106-114. (Year: 2016).*

(Continued)

*Primary Examiner* — Satish Rampuria
(74) *Attorney, Agent, or Firm* — Kevin T. Cuenot

(57) ABSTRACT

A computer-based visualization and refactoring system is capable of analyzing a computer program to determine computation tasks of the computer program and channels linking the computation tasks. The system generates, in a memory of computer hardware, a dataflow graph having nodes representing the computation tasks and edges representing the channels. The edges connect the nodes. Source code representations of the computation tasks are determined. Execution metrics of the computer program are determined. The nodes of the dataflow graph are annotated with the source code representations and the nodes and/or the edges are annotated with the execution metrics. The dataflow graph is displayed on a display device as annotated.

18 Claims, 7 Drawing Sheets

(56) References Cited

OTHER PUBLICATIONS

Banken, Herman, Erik Meijer, and Georgios Gousios. "Debugging data flows in reactive programs." Proceedings of the 40th international conference on software engineering. 2018.pp. 752-763. (Year: 2018).*

Mens, Tom, and Tom Tourwe. "A survey of software refactoring." IEEE Transactions on software engineering 30.2 (2004): pp. 126-139. (Year: 2004).*

Strein, Dennis, Hans Kratz, and Welf Lowe. "Cross-language program analysis and refactoring." 2006 Sixth IEEE International Workshop on Source Code Analysis and Manipulation. IEEE, 2006.pp. 207-216 (Year: 2006).*

Basit, Hamid Abdul, Muhammad Hammad, and Rainer Koschke. "A survey on goal-oriented visualization of clone data." 2015 IEEE 3rd Working Conference on Software Visualization (VISSOFT). IEEE, 2015.pp. 46-55 (Year: 2015).*

Aguiar, Ademar, et al. "Live software development: Tightening the feedback loops." Companion Proceedings of the 3rd International Conference on the Art, Science, and Engineering of Programming. 2019.pp. 1-6 (Year: 2019).*

Intel® High Level Synthesis Compiler Pro Edition: User Guide, A.2.1.1. Reviewing System Information, https://www.intel.com/content/www/us/en/docs/programmable/683456/21-4/reviewing-system-information.html, 5 pages.

Oleksandr Zinenko, Interactive Program Restructuring. Human-Computer Interaction [cs.HC]. Universite Paris Saclay (COmUE), 2016. English. NNT : 2016SACLS437.tel-01414770; https://tel.archives-ouvertes.fr/tel-01414770, HAL Open Science, Dec. 12, 2016, 20 pages.

Legion Programming System, Debugging, https://legion.stanford.edu/debugging/index.html#legion-spy, 10 pages.

* cited by examiner

100

Analyze a computer program to determine computation tasks of the computer program and channels linking the plurality of computation tasks
102

Generate in a memory of the computer hardware a dataflow graph having nodes representing the computation tasks and edges representing channels, wherein the edges connect the nodes
104

Determine source code representations of the computation tasks
106

Determine a plurality of execution metrics of the computer program
108

Annotate nodes of the dataflow graph with source code representations and annotate nodes and/or edges with execution metrics
110

Display the dataflow graph on a display device, as annotated
112

FIG. 1

DATAFLOW-BASED COMPUTER PROGRAM VISUALIZATION AND REFACTORING

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to software development and, more particularly, to a computer-based tool for visualizing and refactoring computer programs using a dataflow-based development paradigm.

BACKGROUND

In a sequential programming paradigm, programs are modelled as a series of operations happening in a specific, e.g., sequential, order. The program focuses on in-line commands consistent with the Von Neumann execution model in which data is viewed as being at rest. By comparison, a dataflow programming paradigm expresses a computer program as a series of tasks. Rather than executing the tasks in a sequential order, each task may be run or executed when the data needed to perform the task is available. The dataflow programming paradigm provides a way to write a computer program that inherently expresses parallelism. Compared to a sequential programming paradigm, dataflow computer programs are inherently parallel and can work well in large, decentralized systems.

SUMMARY

In some aspects, the techniques described herein relate to a method. The method includes analyzing, using computer hardware, a computer program to determine computation tasks of the computer program and channels linking the computation tasks. The method includes generating, in a memory of the computer hardware, a dataflow graph having nodes representing the computation tasks and edges representing the channels. The edges connect the nodes. The method includes determining, using the computer hardware, source code representations of the computation tasks. The method includes determining, using the computer hardware, execution metrics of the computer program. The method includes annotating the nodes of the dataflow graph with the source code representations and annotating the nodes and/or the edges with the execution metrics. The method includes displaying the dataflow graph on a display device as annotated.

In some aspects, the techniques described herein relate to a system. The system includes one or more processors configured to initiate operations. The operations include analyzing a computer program to determine computation tasks of the computer program and channels linking the computation tasks. The operations include generating, in a memory coupled to the one or more processors, a dataflow graph having nodes representing the computation tasks and edges representing the channels. The edges connect the nodes. The operations include determining source code representations of the computation tasks. The operations include determining execution metrics of the computer program. The operations include annotating the nodes of the dataflow graph with the source code representations and annotating the nodes and/or the edges with the execution metrics. The operations include displaying the dataflow graph on a display device as annotated.

In some aspects, the techniques described herein relate to a computer program product. The computer program product includes one or more computer-readable storage media, and program instructions collectively stored on the one or more computer-readable storage media. The program instructions are executable by computer hardware to initiate operations. The operations include analyzing a computer program to determine computation tasks of the computer program and channels linking the computation tasks. The operations include generating, in a memory coupled of the computer hardware, a dataflow graph having nodes representing the computation tasks and edges representing the channels. The edges connect the nodes. The operations include determining source code representations of the computation tasks. The operations include determining execution metrics of the computer program. The operations include annotating the nodes of the dataflow graph with the source code representations and annotating the nodes and/or the edges with the execution metrics. The operations include displaying the dataflow graph on a display device as annotated.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 1 illustrates an example method of computer program visualization.

DETAILED DESCRIPTION

Figure 2:
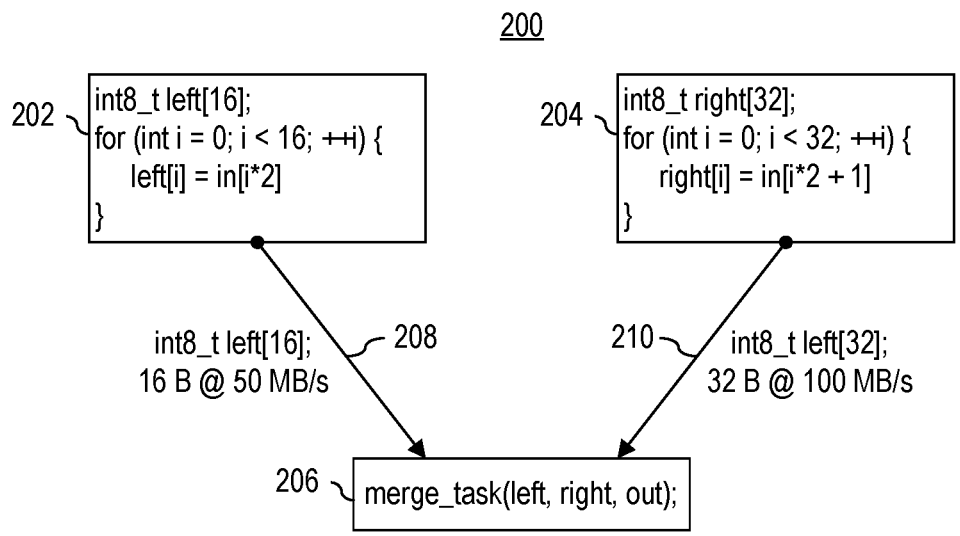
FIG. 2 illustrates an example of a partial dataflow graph of a computer program that may be generated and displayed by a computer-based visualization and refactoring system (system).

This disclosure relates to software development and, more particularly, to a computer-based tool for visualization and refactoring computer programs using a dataflow-based development paradigm.

Conventional techniques for creating dataflow graphs have required that the user create a fully functional dataflow computer program. That is, conventional visualization tools require a working dataflow computer program as input to generate a dataflow graph as a visualization. Conventional visualization tools, however, are incapable of determining various performance metrics for the dataflow computer program. Other tools, e.g., performance evaluation tools, have been used to generate performance metrics for the dataflow computer program.

Despite the availability of these performance metrics, the performance evaluation tools were unable to correlate the performance metrics to particular portions of the dataflow graph as generated by the visualization tools. Significant design expertise in the field of dataflow computer programs was required to correlate the performance metrics to the appropriate portions of the dataflow graph. As such, the user was tasked with determining which portions of the dataflow graph required reworking to alleviate any performance bottlenecks based on the uncorrelated performance metrics.

Even if one were to correctly discern which portion(s) of the dataflow graph required modification, the user had to manually rewrite the underlying dataflow computer program and then undertake the process anew. That is, as part of an iterative process, the rewritten dataflow computer program was again provided to the visualization tool and the performance evaluation tool. The user would again need to correlate the uncorrelated and new performance metrics with the newly generated dataflow graph of the dataflow computer program. This process would be necessary to determine whether the changes to the underlying dataflow computer program remedied the performance issues.

In accordance with the inventive arrangements described herein, methods, systems, and computer program products are provided that are capable of analyzing a computer program and generating a dataflow graph representation of the computer program. The dataflow graph may be displayed via a display device. Within the dataflow graph as displayed, various execution metrics may be displayed in association with the relevant elements of the dataflow graph. The inventive arrangements also make different actions available to users that facilitate refactoring the dataflow graph. This allows the user to continue building and/or modifying the dataflow graph to improve performance of the ultimate implementation of the computer program without having to first rewrite the original computer program. The inventive arrangements facilitate the detection of portions of the computer program that require changing or modification to achieve improved performance (e.g., such as reduced runtime).

In one or more example implementations, the computer program may be visually represented as a dataflow graph whether the computer program was developed using a dataflow development paradigm or a sequential programming paradigm. In other words, the inventive arrangements described herein are capable of generating a dataflow graph representation of a computer program, where the dataflow graph includes embedded performance metrics and guidance before the computer program is converted into dataflow form. The available actions allow users to quickly refactor the dataflow graph. The refactoring may be performed in the same view of the dataflow graph thereby immediately determining and illustrating the effects of any changes to the dataflow graph without the user having to embark on an iterative process of modifying the original source code of the computer program.

As such, the inventive arrangements are capable of operating on computer programs even in cases where the computer program was not written using specialized dataflow Application Programming Interfaces (APIs), libraries, or languages. The inventive arrangements are capable of automatically determining the dataflow structure from the computer program. In one or more examples, the inventive arrangements are capable of using performance models to determine execution metrics presented by way of the dataflow graph prior to the computer program being compiled into an executable form. This illustrates potential improvements of the computer program to the user if the computer program were to be restructured or implemented as a dataflow computer program. The refactoring capabilities described herein may be performed by the system directly from the view of the dataflow graph that is presented. The refactoring actions may be performed to immediately reflect the effects of the actions on performance of the computer program by way of the dataflow graph visualization.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example method 100 of computer program visualization. The operations described in connection with FIG. 1 may be performed by a computer-based visualization and refactoring system (system). The system may be implemented as a data processing system executing suitable program instructions. An example of a data processing system that may be used to implement a computer-based visualization and refactoring system as described within this disclosure is described in connection with FIG. 9.

In block 102, the system analyzes a computer program to determine computation tasks of the computer program and channels linking the plurality of computation tasks.

In one or more example implementations, the computer program is a dataflow computer program. The computer program may be written in a dataflow computer programming language, use dataflow libraries, and/or use dataflow APIs. Examples of dataflow computer programming languages include, but are not limited to, ASCET, AviSynth scripting language, Binary Modular Dataflow Machine (BMDFM), Cuneiform, CMS Pipelines, Nyquist, Ptolemy II, and the like. In one or more other examples, the dataflow computer program may be written in a computer programming language that includes dataflow features. An example of a dataflow feature includes Unix pipes.

In a dataflow computer program, data is not viewed as being at rest, but rather as flowing between the computation tasks (e.g., operations). Computation tasks have explicitly defined inputs and outputs that connect to other computation tasks. The computation tasks may be considered "black boxes." In the general dataflow computer program model, computation tasks execute as soon as all of the inputs for that computation task become valid. In other dataflow computer program models, execution may begin earlier, e.g., such as when first data becomes ready or available. In the case where the computer program is a dataflow computer program, the system is capable of detecting language, API, and/or library-specific instructions, constructs, and/or directives that indicate or define the computation tasks and the channels.

In one or more other example implementations, the computer program is a sequential computer program. In that case, the computer program may be written in a computer programming language such as C/C++. In the case of a sequential computer program, the system is capable of identifying variables, whether scalar or array, as channels. Each write of a variable to a portion of allocated memory is considered to be the same as pushing a value into a channel. Each read of a variable from memory is considered to be the same as reading a value from the channel.

In one or more example implementations, as part of block 102, the system is capable of extracting the graph structure from the computer program based on a static analysis of the source code. The system is capable of turning groups of statements that execute sequentially into computation tasks. In one aspect, the system is capable of grouping instructions into computation tasks where the grouping is maintained so long as the resulting dataflow graph does not include cycles. The system further is capable of detecting data dependencies between the instructions and representing the data dependencies as edges.

As an illustrative and non-limiting example, the system may form a computation task to include each statement in a particular region of program code such as a function or a loop body. Further, the system may group, or not group, selected statements depending on what the statements are. For example, the system may group textually contiguous and non-compound statements into a computation task and omit statements such as function calls from the grouping.

In block 104, the system generates a dataflow graph. The dataflow graph may be generated and stored in a memory of the system. The dataflow graph has nodes representing the computation tasks and edges representing channels that convey data. The edges connect the nodes. The dataflow graph represents the computer program as one or more computation tasks (e.g., nodes) that are connected by zero, one, or more channels (e.g., edges). Nodes may be connected when the computation tasks represented by the nodes access (e.g., read and/or write) the same data. In the case where the computer program is a dataflow computer program, the semantics imply that the computation tasks start as soon as data is available on inputs to the computation task.

In block 106, the system determines source code representations of the computation tasks. The system is capable of determining the source code defining each computation task. The system creates a record that associates each portion of source code defining a computation task with the particular node of the dataflow graph representing the computation task.

In one or more example implementations, the source code representations represent the actual portion, e.g., instructions, of the source code defining the computation task represented by the node. In another example implementation, the source code representation may be a subset of the instructions or a summary of the instructions that define the computation task represented by the node. The system stores the source code representations in association with the respective nodes.

In block 108, the system determines a plurality of execution metrics of the computer program. Examples of execution metrics that may be determined by the system can include, but are not limited to, channel names, channel widths, access modes, volume of data transmitted over a channel, and throughput of a channel. It should be appreciated that a dataflow computer program and a sequential computer program are not limited to being executed on any particular hardware platform. Still, the particular execution metrics of the computer program may depend on the particular hardware platform to be used to execute the computer program. In this regard, the particular execution metrics that are determined by the system may depend on the particular hardware platform that is selected to execute the computer program. The user, for example, may specify or select the hardware platform to be used for purposes of determining the execution metrics.

A channel name refers to the name of the program variable representing the data accessed by the particular computation tasks connected by the channel. The channel name may also include or indicate a type of the variable. The channel name, when applied to the dataflow graph, illustrates the structure of the computer program thereby allowing variables of importance to be detected within the computer program.

In a sequential computer program, channels do not exist. In that case, for a sequential computer program, the system is capable of determining memory allocations, e.g., variables, used by particular computation tasks. The system is capable of treating each variable as a channel for purposes of representing the sequential computer program as a dataflow graph. As such, the conveyance of data via variables may be represented as channels in the dataflow graph for a sequential computer program despite the fact that channels do not exist in the sequential computer program.

Channel width specifies a size of the data elements transmitted over a channel. Channel width may be used to illustrate bottlenecks in the dataflow graph. In a dataflow computer program, channels are explicitly indicated by way of particular instructions and/or directives that vary based on the particular programming language used. The data type of the channel may be used by the system to determine channel width. As discussed, in the case of a sequential computer program, the system identifies variables, which may include scalar and/or array variables, as channels. The channel width may be determined from a type of the data conveyed on the channel.

Access mode specifies a type of access occurring. An access mode may be specified for each end of a channel. For example, in the case of a dataflow computer program with two nodes connected by an edge, one node writes data to the channel while the other node reads data from the channel. In that case, the access mode of the end of the edge coupled to the data producer node is write while the access mode of the end of the edge coupled to the data consumer node is read.

In the case of a sequential computer program, the way a computation task is split or represented in the dataflow graph may include multiple access modes for a given end of a channel. For example, a computation task may perform both reads and writes to an array. As such, the computation task, as represented by a node, may have both a read and write accesses that appears to the system as if both a read and a write are occurring on a same end of a channel. This may be the case on both ends of a given channel.

Volume of data transmitted over a channel specifies an amount of data transmitted over the channel. In one or more examples, the volume of data transmitted over a channel can be computed as an average volume of data communicated for every execution iteration of the computer program when multiple execution iterations of the computer program are performed. An execution iteration is one execution of the complete computer program where an input is processed through the computer program to generate a corresponding output. The volume of data may be used to detect imbalances between different edges representing channels.

In some cases, the volume of data flowing through a channel on each execution for a given data set is fixed. In other cases, the volume of data flowing through a channel may vary and depend on the data upon which the computation task operates. As an illustrative and nonlimiting example, a computer program may operate on images where different images have different numbers of pixels. Differently sized images may have different numbers of pixels thereby illustrating a scenario where a channel may convey a variable volume of data.

Throughput of a channel may be the amount of data conveyed through a channel per unit time. In one or more example implementations, the throughput may be computed as the volume or amount of data transmitted over a channel divided by the Initiation Interval (II) of the computer program. Typically, a computer program modeled using a dataflow paradigm is executed multiple times in an iterative manner (e.g., the computer program has multiple execution iterations). The computer program may be viewed as a pipelined system in which a new execution iteration of the computer program starts before a prior execution iteration of the computer program completes. That is, consecutive execution iterations of the computer program may overlap. The term "Initiation Interval" or "II," as used within this disclosure, means a minimum amount of time between two consecutive execution iterations of a computer program that guarantees correctness in execution of the computer program. If the amount of time between two consecutive execution iterations of the computer program is less than the II, the correctness of the results cannot be guaranteed.

In one or more example implementations, the system is capable of analyzing the computer program, optionally compiling the computer program, and optionally executing the computer program using a user specified data set that is representative of the data to be processed by the computer program in the field. The system is capable of profiling the computer program during execution to determine one or more of the execution metrics. In other examples, metrics may be determined through a static analysis of the computer program.

In block 110, the system annotates the dataflow graph. For example, the system annotates the nodes of the data flow graph with the source code representations. The system annotates the edges of the dataflow graph with one or more of the execution metrics. The system is also capable of annotating the nodes with one or more of the execution metrics.

In block 112, the system displays the dataflow graph, as annotated, on a display device of the system. Thus, as displayed, the nodes of the dataflow graph include the source code representations and the edges are annotated with the execution metrics. The nodes may also be annotated with execution metrics.

FIG. 2 illustrates an example of a partial dataflow graph 200 of a computer program that may be generated and displayed by the system. For example, (partial) dataflow graph 200 does not illustrate channels coming into the computation tasks from outside of the dataflow graph or exiting the dataflow graph from the computation tasks. In the example of FIG. 2, dataflow graph 200 includes nodes 202, 204, and 206, each representing a computation task of the computer program from which dataflow graph 200 was generated. In the example, each node 202, 204, and 206 is annotated with a representation of the source code defining the computation task represented by the respective node.

Node 202 is connected to node 206 via edge 208. Node 204 is connected to node 206 via edge 210. In the example, each of edges 208, 210 is annotated with execution metrics determined for the computer program. For example, edge 208 has a channel name of "int8_t left[16]". The system determines that the channel width is 8 bits as indicated by the data type of "int8_t". Edge 210 has a channel name of "int8_t left[32]". The system determines that the channel width is 8 bits as indicated by the data type of "int8_t". The access mode for edge 208, as indicated by the directional arrow, indicates that node 202 writes to edge 208, while node 206 reads from edge 208. The access mode for edge 210, as indicated by the directional arrow, indicates that node 204 writes to edge 210, while node 206 reads from edge 210.

Each edge is also annotated with a volume of data. For example, the instruction "int8_t left[16]" declares an array of 16 elements of integer type. Given that the channel represented by edge 208 is 8 bits wide (e.g., 1 byte), the volume of data for edge 208 is determined to be 16 bytes (16 B) and is annotated as such. The instruction "int8_t left[32]" declares an array of 32 elements of integer type. Given that the channel represented by edge 210 is 8 bits wide (e.g., 1 byte), the volume of data for edge 210 is determined to be 32 bytes (32 B) and is annotated as such. The channel represented by edge 208 has a throughput of 50 MB per second as annotated. The channel represented by edge 210 has a throughput of 100 MB per second as annotated.

FIG. 2 is provided for purposes of illustration and not limitation. The system may determine other execution metrics and annotate the dataflow graph with such other execution metrics. The system may annotate such execution metrics on the edges, the nodes, and/or on particular portions of nodes (e.g., particular instructions annotated on a node may be further annotated with an execution metric). As an illustrative example, the system may determine the II of one or more or each of the computation tasks 202, 204, and/or 206. The system may calculate predicted latency of one or more or each computation task and do so on a per instance basis. The system may annotate such execution metrics on the respective nodes.

Within this disclosure, the term annotation means a visual indicator on a dataflow graph that specifies a performance metric, wherein the performance metric and the visual indicator corresponds to an edge, a node, or a portion of a node. Within this disclosure, the term "sub-node annotation" means an annotation specifying a performance metric that is applicable to a portion of a node and not to the node itself in its entirety.

In one or more other example implementations, selected execution metrics may be associated with particular instructions or a set of instructions within a given node rather than with the node itself. For example, the system may analyze a loop construct within a given node and annotate the loop construct within the node with a sub-node annotation specifying one or more execution metrics. A sub-node annotation may be visually distinguished from an annotation of an edge and/or an annotation of a node itself. This means that the system is capable of determining and annotating sub-portions of a node. Referring to the example of FIG. 2, the system may analyze the loops of nodes 202 and 204, determine that the loops have no loop carried dependencies, and indicate via sub-node annotation(s) the execution metric(s) indicating that the loops can be parallelized. Other example execution metrics that may be annotated on the dataflow graph as sub-node annotations indicate that accesses to a variable are unique such that buffering these accesses would not reduce runtime performance. The system also may determine whether the variable accesses are contiguous such that the accesses are good candidates for implementation as streams. The system may indicate these execution metrics for the particular variable accesses as sub-node annotations.

In another example, with regard to throughput of the computer program, the system may determine the program II and divide the volume by the II. The system may determine volume from static or dynamic analysis. To compute the II of the computer program, the system may use available and/or known techniques involving, for example, analyzing computation task dependencies and/or estimating how long the instructions of a computation task would run in a longest dependency chain for all the dependencies. In this regard, computation of the II may require the system to have knowledge about the target hardware to determine how the computer program will be scheduled and be able to predict execution time of particular statement sequences (e.g., given the target platform using estimation and/or simulation).

Examples of different target hardware may include a particular type of processor, whether certain portions of the computer program are to be implemented in circuitry (e.g., as programmable logic), in a processor array, using a particular Graphics Processing unit (GPU), or the like. The target hardware may also have a particular memory architecture that influences the timing estimates for execution and/or implementation of the computer program therein.

In one or more example implementations, in cases where the amount of data, e.g., volume of data, transmitted over a given channel varies from one execution iteration to another or varies based on the particular data provided as input to the computer program, the system may annotate the volume of the edge on the dataflow graph as being variable. The system, for example, may determine an estimate of the volume given a particular data set to be processed or based on multiple simulations of the computer program, but provide a visual indicator that the volume provided is considered variable or non-constant from one execution iteration to the next.

In one or more example implementations, in cases where the system determines that the access mode for an end of an edge has both a read and a write access, the system is capable of flagging the edge or the particular end of the edge to indicate the condition as illegal. The flagging of the edge indicates to the user that to transform the computer program, e.g., a sequential computer program, into a dataflow computer program, the computer program will need to be refactored so that each end of an edge has one type of access such that one end is a read access and the other end of the same edge is a write access.

The foregoing discussion of execution metrics and annotations is provided for purposes of illustration and not limitation. The system is capable of determining any of a variety of execution metrics for the computer program, whether at the level of a computation task (e.g., node) or at the level of particular groups of instructions (e.g., sub-computation task or sub-node) and annotating the dataflow graph with such information.

Figure 3:
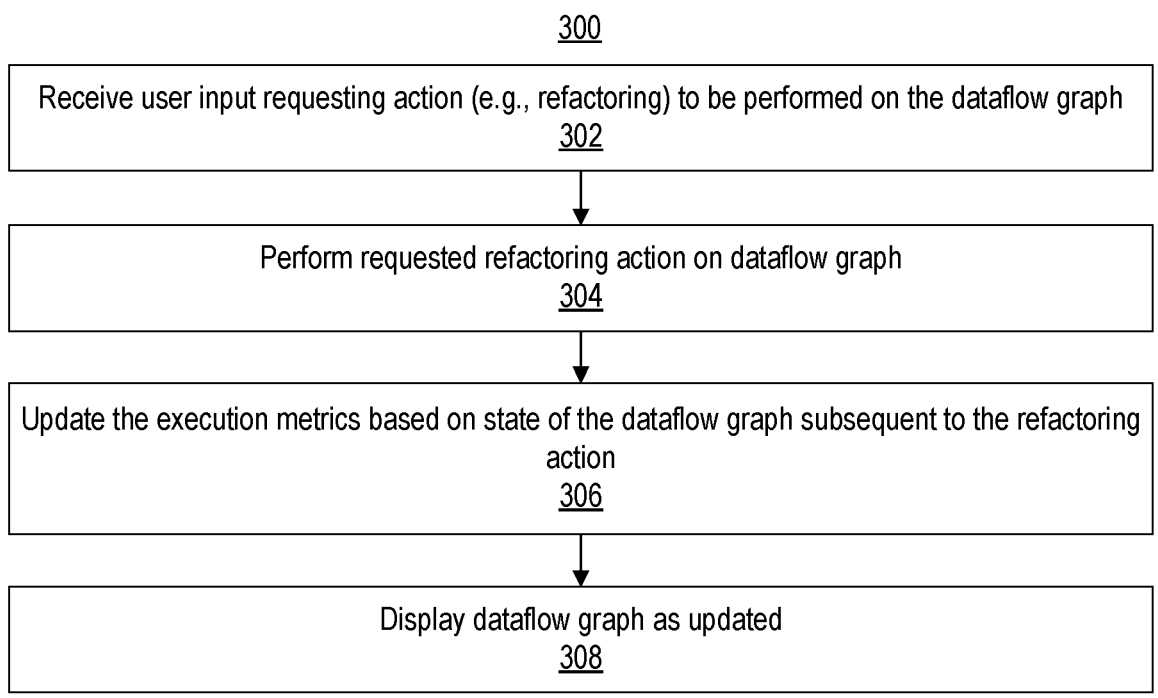
FIG. 3 is an example method illustrating certain operative features of the inventive arrangements.

FIG. 3 is an example method 300 illustrating certain operative features of the inventive arrangements. Method 300 illustrates different ways in which the dataflow graph visualization generated by the system may be extended. For example, method 300 illustrates various refactoring actions that may be performed on the dataflow graph visualization that is generated by the system. The actions described in connection with FIG. 3 may be performed by the system described herein.

In block 302, the system receives a user input requesting an action to be performed on the dataflow graph. The requested action may be a refactoring action. In block 304, the system performs the requested refactoring action on the dataflow graph. The system may operate on the nodes and/or the edges in performing the refactoring action. In performing the refactoring action, the system may restructure the nodes of the dataflow graph and/or the edges of the dataflow graph. The system is capable of updating the connectivity of the resulting arrangement of nodes by adjusting the edges. For example, the system may reconnect the resulting arrangement of nodes in some cases. Performing refactoring actions allows users to progress in the computer program transformations required to improve performance.

In block 306, the system is capable of updating the execution metrics for the dataflow graph based on the state of the dataflow graph subsequent to, e.g., in response to, performing the refactoring action. In block 308, the system is capable of displaying the dataflow graph as updated. That is, the system is capable of displaying an updated version of the dataflow graph subsequent to performing the requested refactoring action. The updated version of the dataflow graph is annotated with any updated source code representations from refactoring actions performed on nodes and is annotated with any updated execution metrics from refactoring actions performed on nodes and/or edges.

For purposes of illustration, the refactoring action may include merging two or more selected nodes into a single node. Merging two or more selected nodes allows the user to define coarser computation tasks in the dataflow with different performance profiles. In one example, the system, responsive to a user request, may merge two consecutive computation tasks connected by a channel. The system, in performing the merge, may combine the source code representations of the nodes being merged into a single source code representation that is displayed on the merged node.

The refactoring action may include splitting a selected node into two or more nodes. Splitting nodes allows the user to define finer grained computation tasks with different performance profiles. In one example, the system, responsive to a user request, may split a node between two consecutive statements or instructions in a given node representing a computation task. The system, in performing the split, may split the source code representation of the node being split into two or more different source code representations corresponding to the resulting nodes that are generated.

The refactoring action may include removing a selected node from the dataflow graph. Removing a node simulates a refactoring of the computer program where a portion of the computer program is removed. As an illustrative and non-limiting example, removal of a node may be performed, upon user request, during early states of design exploration as the user refines the computer program to a limited set of functionalities in order to ease the optimization process.

The refactoring action may include adding a new node to the dataflow graph. Adding a new node, in response to a user request, allows the system to simulate the extension of the computer program with arbitrary program code having known properties that may be ascribed to the new node. That is, the program code may not be written, but the attributes of the program code to be written may be known and ascribed to the node and used as the source code representation thereof and/or to compute updated execution metrics for annotation purposes.

Other refactoring actions may be specific to the channels. Further example refactoring actions that may be performed in response to a user request can include, but are not limited to, adding a channel (edge), removing a channel (edge), and/or reconnecting a channel (edge) to connect different nodes. Implementing edge modifications visually demonstrates the effects of the refactoring actions on performance of the computer program.

In one or more other example implementations, the user may modify channel (edge) properties to simulate transformations of the underlying program code before actually performing the modifications. The system, in updating the dataflow graph in response to modification of channel properties visualizes to users performance benefits from any refactoring prior to the user modifying actual program code (e.g., source code) of the computer program.

In each case, the user may specify particular attributes to be observed in performing the action. For example, in merging two or more nodes, the attributes may indicate an ordering of the computation tasks where the computation tasks of the merged nodes are serialized into a single, larger node in the designated order. The system may automatically adjust the edges based on the merge operation and update the execution metrics of such edges.

In another example, in splitting a node, the user may specify attributes that indicate whether the resulting nodes are to be arranged or connected in serial (e.g., in pipelined fashion) or in parallel. The system may automatically adjust the edges based on the merge operation and update the execution metrics of such edges. Regardless of the type of action performed, the system is capable of updating the dataflow graph and any execution metrics annotated on the graph in response to each refactoring action.

In one or more example implementations, certain refactoring actions may be performed on the content of particular computation tasks (e.g., on portions of computation tasks). These refactoring operations may be combined with other refactoring actions described herein. As an illustrative and non-limiting example, the system is capable of performing a loop refactoring action on a loop within a given computation task represented by a node in the dataflow graph. An example of a loop refactoring action is a loop unroll operation. The loop unroll operation may be used in combination with one or more other refactoring actions. Other examples of loop refactoring actions include, but are not limited to, fission, fusion, flattening, interchanges, and the like.

Still other examples of refactoring actions may be performed by the system on the dataflow graph on other types of constructs. An example of another refactoring action may include, but is not limited to, a refactoring action on a function call. The refactoring action may be to inline the function call directly in the dataflow graph, thereby allowing for more refactoring actions to be performed on the inlined function body.

Figure 4:
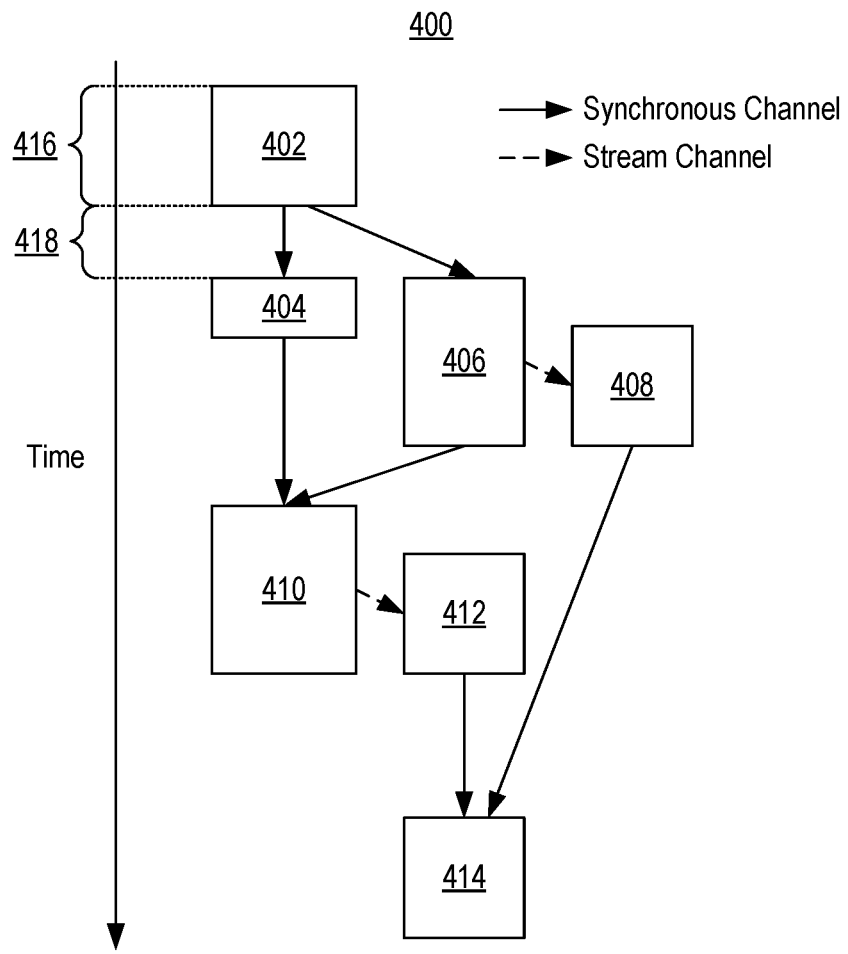
FIG. 4 illustrates another example of a dataflow graph of a computer program that may be generated and displayed by the system.

FIG. 4 illustrates another example of a dataflow graph 400 of a computer program that may be generated and displayed by the system. In the example of FIG. 4, dataflow graph 400 includes nodes 402, 404, 406, 408, 410, 412, and 414. In the example of FIG. 4, different types of channels are illustrated using different visualizations for the edges. For example, synchronous channels are illustrated with edges that are solid. Stream channels are illustrated with edges that are dotted or dashed.

A synchronous channel is a connection between two or more nodes where some portion or all of the data generated by the data producing node must be generated and stored in memory before the data consuming node is able to begin operating on, or consuming, the data. For a synchronous channel, once a sufficient amount of data is generated, the consumer node is notified of the availability of the data so that the consumer node may begin consuming. Accordingly, for a synchronous channel, the consumer node must wait for some amount of data production to be complete before proceeding. A stream channel is a connection in which a value is pushed onto the channel from the data producing node to the data consuming node immediately. As soon as the consuming node receives the value, the consuming node may use the value upon receipt. The nodes connected by a stream channel may run at the same time. Channel type, e.g., synchronous or stream, may be explicitly indicated in the source code of the computer program or implicitly indicated.

In one or more example implementations, the system is capable of sizing nodes of the dataflow graph according to one or more different execution metrics. In the example, the dataflow graph 400 is displayed with a time reference or timeline shown as a vertical axis. In one aspect, the system is capable of generating the dataflow graph 400 by sizing the nodes according to latencies of the computation tasks represented by the respective nodes. In one or more examples, the size of a node is indicative of the amount of time needed for the computation task represented by the node to execute. More particularly, in the example of FIG. 4, the vertical length of a node against the timeline indicates the amount of time needed for the computation task represented by the node to execute. Thus, the arrangement of dataflow graph 400 illustrates the time required to execute for a single execution iteration of the computer program.

As displayed by the system, the time required for the computation task represented by node 402 to execute is illustrated by 416. Thus, the sizing of nodes in the dataflow graph 400 as performed by the system visually indicates that the computation task represented by node 402 requires more time to execute than the computation task represented by node 404. Similarly, the computation task represented by node 406 requires more time to execute than the computation tasks represented by nodes 402 and 408. The amount of time between the end of execution of the computation task represented by node 402 and the start of execution of the computation task represented by node 404 is given by 418.

The layout or arrangement of nodes also illustrates the relative timing of when one computation task executes relative to another against the timeline. For example, two nodes that overlap on the timeline indicates that the computation tasks represented by the nodes can run concurrently. The dataflow graph further indicates which computation tasks do not run concurrently.

Figure 5:
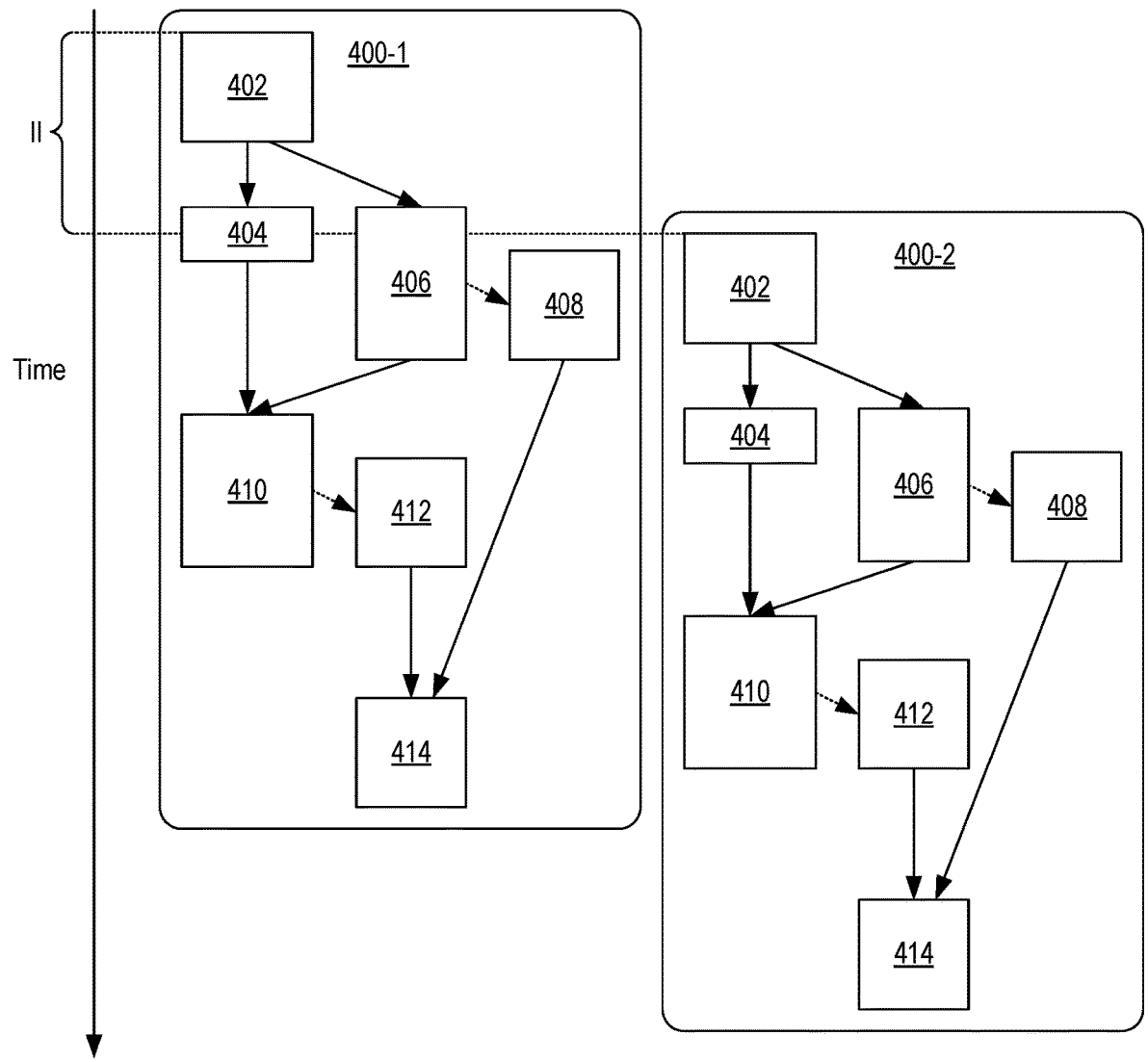
FIG. 5 illustrates another example of a visualization that may be displayed on a display device by the system.

FIG. 5 illustrates another example of a visualization that may be displayed on a display device by the system. In the example of FIG. 5, the system has calculated the II of the computer program represented by dataflow graph 400. In the example of FIG. 5, the system has generated two instances of dataflow graph 400 shown as instance 400-1 and 400-2. Each instance represents an execution iteration of the computer program. The system has positioned each instance of dataflow graph 400 offset by the computed II. That is, the start of execution of instance 400-2 (e.g., the top of node 402) is offset from the start of execution of instance 400-1

(e.g., the top of node 402 in instance 400-2) by a distance on the timeline corresponding to the II. In the example of FIG. 5, the system visually illustrates how the computer program may be pipelined for multiple execution iterations.

In another aspect, the system is capable of determining the II for particular computation tasks. On a computation task level, the II for a particular computation task indicates the amount of time to wait from a first execution of the computation task before that computation task may be executed again. The II of the individual tasks dictate the II of the computer program as a whole. That is, the II of the computer program will depend on the computation task having the largest II. In this example, the system is capable of displaying, as an execution metric, the II for each of the nodes illustrated. Further, the system is capable of visually indicating which nodes have the largest II. In another example, the nodes may be visually distinguished from one another, e.g., by color, pattern, size, or the like, to indicate an ordering of II from low to high or high to low.

Figure 6:
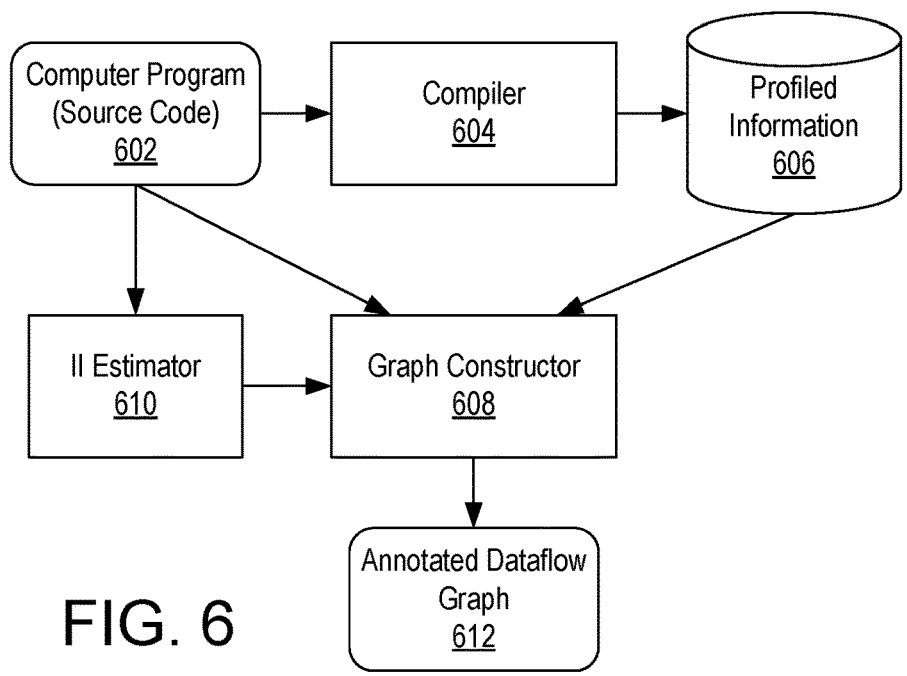
FIG. 6 illustrates an example of an executable software architecture for the system.

FIG. 6 illustrates an example of an executable software architecture implemented in in a computer-based visualization and refactoring system. In the example, a computer program 602, e.g., expressed in source code, may be provided to a compiler 604. In one aspect, compiler 604 optionally performs compilation and profiling of computer program 602 to generate profiled information 606. Graph constructor 608 receives computer program 602 and optionally profiled information 606 as input. Graph constructor 608 optionally receives timing data specifying II information for computer program 602.

In one aspect, graph constructor 608 generates annotated dataflow graph 612 based on a static analysis of computer program 602. For example, graph constructor 608 may generate annotated dataflow graph 612 based solely on an analysis of the source code of computer program 602. In some cases, it is desirable to profile one or more execution iterations of computer program 602 to collect more information such as hard-to-analyze data dependencies or memory access rates. In this regard, graph constructor 608 may also utilize timing information from II estimator 610 to generate annotated dataflow graph 612. In another aspect, graph constructor 608 generates annotated dataflow graph 612 based on a static analysis of computer program 602, timing data from II estimator 610, and profiled information 606.

In the general case, the information needed to generate annotated dataflow graph 612 can be obtained directly from static analysis of computer program 602. Some execution metrics relating to II are dependent on the performance of the computer program 602 as implemented on particular target hardware. In one or more example implementations, II estimator 610 may be implemented as a performance predictor. In one or more other example implementations, II estimator 610 may be implemented as a performance profiler. A performance profiler executes the computer program. A performance profiler may execute the computer program on the target hardware. A performance predictor does not require actual execution of computer program 602 on the target hardware.

Figure 7:
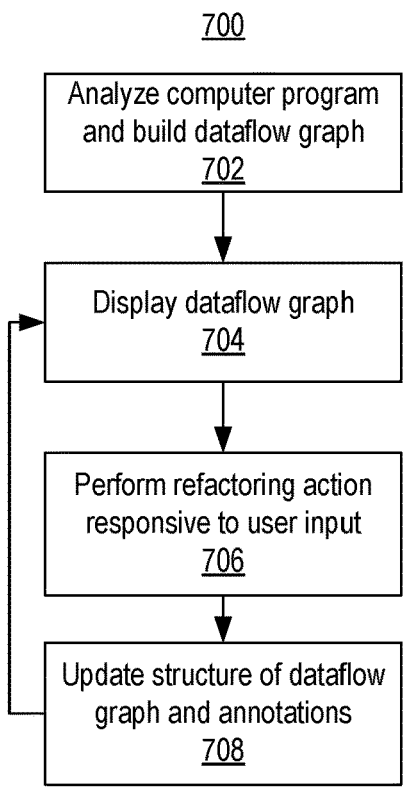
FIG. 7 illustrates another example method illustrating certain operative features of the inventive arrangements disclosed herein.

FIG. 7 illustrates another example method 700 illustrating certain operative features of the inventive arrangements disclosed herein. Method 700 may be performed by the system described herein.

In block 702, the system analyzes the computer program and builds the dataflow graph. In block 704, the system displays the dataflow graph. The dataflow graph is annotated. The annotations may include the source code representation on nodes, other annotation on nodes, sub-node annotations, and annotations on edges corresponding to execution metrics. The annotations may be applied to the nodes and/or the edges. The dataflow graph may be displayed to the user on a display device as the initial state of the user's computer program.

From the initial state, a user may analyze the current state and determine one or more actions to be performed on the dataflow graph. In one or more examples, the system flags particular conditions in the dataflow graph that is displayed thereby indicating a need to refactor portions of the dataflow graph to implement the computer program as a dataflow computer program. Alternatively, the user may decide that the structure and initial performance of the computer program is satisfactory and take no further action.

Starting in block 706, the user may interact with the dataflow graph by requesting one or more refactoring actions be applied to the graph. In block 706, in response to receiving a user input requesting performance of a refactoring action on the dataflow graph, the system performs the requested refactoring action. Performing the refactoring action initiates an update of the dataflow graph in block 708. In one aspect, the refactoring actions that may be performed may be made available to the user directly from within the view presenting the dataflow graph.

The system, in block 708, is capable of updating the structure of the graph, e.g., the particular nodes of the dataflow graph and any edges connecting the nodes. The system further determines the effect of any structural changes to the dataflow graph on the execution metrics. Method 700 may loop back to block 704 to display the updated dataflow graph on the display device.

The iterative process of FIG. 7 allows a user to view the results of applying particular refactoring actions to the dataflow graph. For example, in response to initiating a split action, the resulting two nodes may not be placed in parallel as a consequence of the way that each node performs data access. In that case, the system visually indicates that the two nodes, having been created from a split action, are not parallel. The visual indication, e.g., highlighting or a message, may prompt the user to undo the split operation if no increase in performance is achieved since the resulting nodes are executed sequentially despite the split. Similarly, the system may visually indicate two nodes that are sequential that may be merged into a single larger node since there is no performance benefit to maintaining the two nodes as distinct computation tasks (e.g., there is no parallelization benefit).

In one or more example implementations, any refactoring actions may be simulated in the dataflow graph representation or may be modeled to determine the effect of the refactoring action on execution of the underlying computer program.

In one or more example implementations, the system is also capable of implementing the refactoring action performed on the dataflow graph on the actual source code of the computer program represented by the dataflow graph. For example, in response to a merge action, the system is capable of serializing, within the computer program, the portions of source code represented by the merged nodes of the dataflow graph. The action serializes the source code of two different computation tasks into a single computation task. In response to a split action, the system is capable of replicating, within the computer program, the portion of source code represented by the node of the dataflow graph to be split. In response to a node removal action, the system is capable of deleting or removing, from within the computer program, the portion of source code represented by the removed node of the dataflow graph. In response to a new node action, the system is capable of creating, within the computer program, predetermined source code (e.g., from a template or the like) representing a new computation task or other new programming construct as may be specified by the user as part of the request to perform the new node action.

Other changes to the source code of the computer program may include changes to the channels. For example, a change in connectivity of an edge may drive a corresponding change in the connectivity of the channel represented by the edge in the source code. A changed attribute of a channel may result in a change of a datatype of a variable and/or the size of a data element in the source code.

Method 700 may be performed at the request of the user in an iterative manner to explore different implementation options for the computer program. In response to each refactoring action, the system is capable of automatically updating the dataflow graph to reflect the changes performed. For example, in response to a user request to perform a refactoring action, the system is capable of performing the refactoring action and displaying the resulting, updated dataflow graph as described herein in real-time.

In one or more example implementations, the system is capable of unfolding selected computation tasks. A computation task itself, e.g., a node representing the computation task, may be viewed as a dataflow region. In response to a user request, for example, the system may generate a sub-dataflow graph for a particular selected node of the dataflow graph. In that case, the system is capable of generating a sub-dataflow graph representing the source code of the selected node. Accordingly, the system is capable of creating hierarchy in the dataflow graph by, for a selected computation task formed of sequential program code, generating a sub-dataflow graph representing the selected computation task. This allows a computation task to be represented as a sub-dataflow graph of the larger dataflow graph.

For example, the source code of a selected node, e.g., the computation task represented by the node, may be sequential. The user may request application of one or more refactoring actions to the sub-dataflow graph of the computation task. In this manner, the computation task itself may be optimized by generating parallel (e.g., node split) sub-computation tasks from the sequential program code of the computation task or performing any of the other refactorization actions on the sub-dataflow graph of the selected node. This capability allows the user to create further hierarchy within the dataflow graph by tuning individual computation tasks by operating on the sub-dataflow graphs of the respective computation tasks within the larger dataflow graph.

Figure 8:
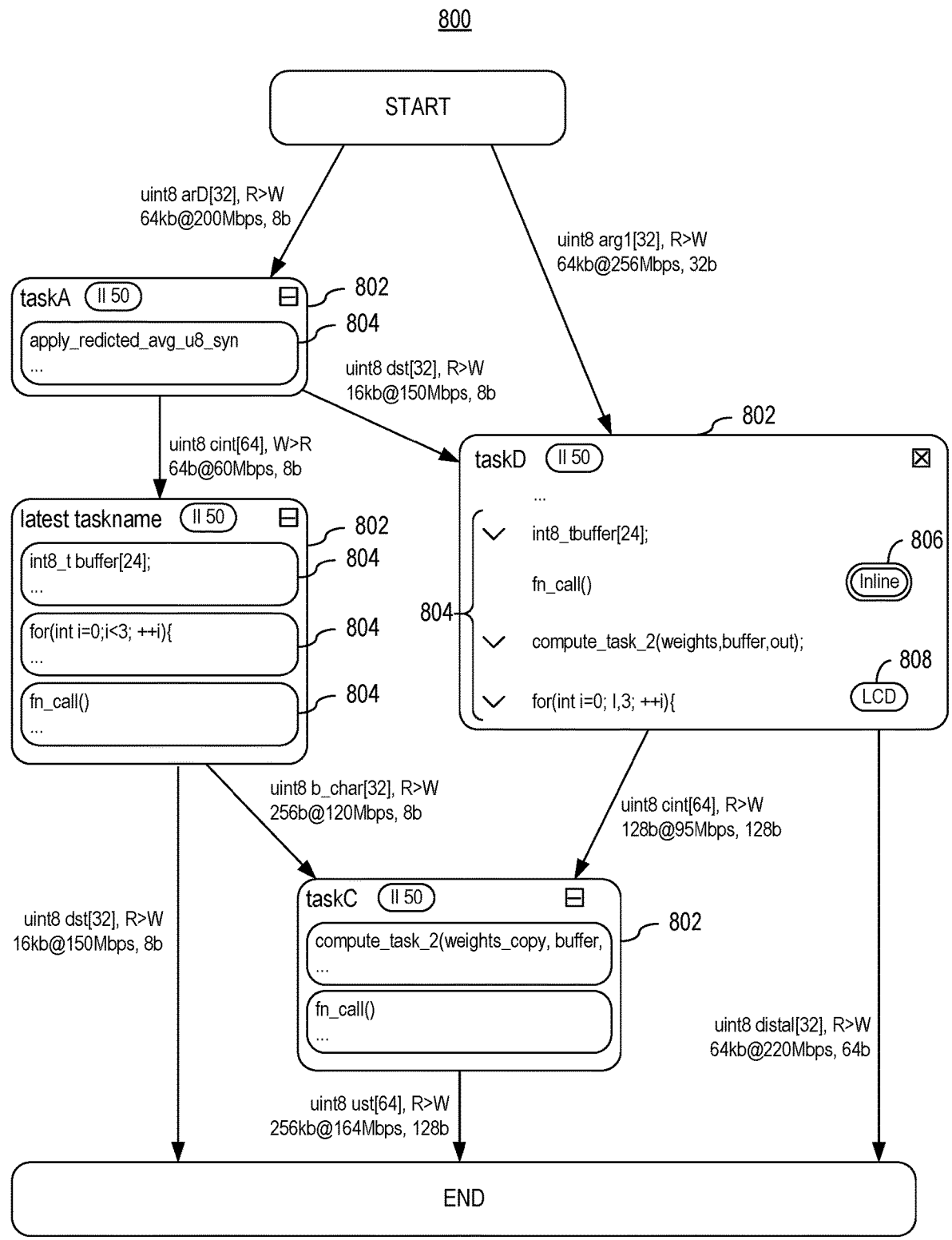
FIG. 8 illustrates another example of a dataflow graph of a computer program that may be generated and displayed the system.

FIG. 8 illustrates another example of a dataflow graph 800 of a computer program that may be generated and displayed the system. Dataflow graph 800 illustrates an example implementation of how in-node content may be displayed and annotated by the system. As illustrated, a variety of execution metrics are annotated on nodes 802 and edges of dataflow graph 800. Nodes 802 also are annotated with source code representations 804. Various controls and annotations are illustrated in relation to the source code representations shown in the node labeled "taskD". An inline control (e.g., a button) 806 is presented next to the function call. In response to a user selection of the inline control 806, the system inlines the function call next to the control. The "LCD" annotation 808, which stands for "loop carried dependency," indicates that the loop shown next to the annotation may not be parallelized.

Figure 9:
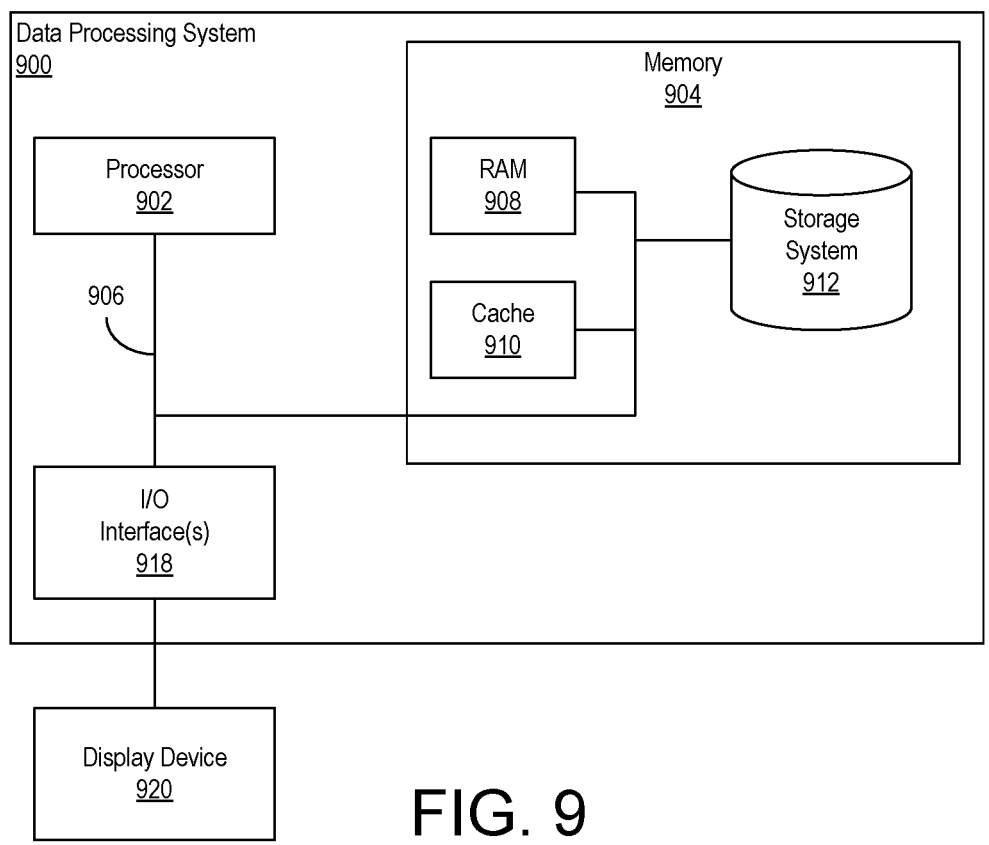
FIG. 9 illustrates an example implementation of a data processing system for implementing the system.

FIG. 9 illustrates an example implementation of a data processing system 900. As defined herein, the term "data processing system" means one or more hardware systems configured to process data, each hardware system including at least one processor and memory, wherein the processor is programmed with computer-readable instructions that, upon execution, initiate operations. Data processing system 900 can include a processor 902, a memory 904, and a bus 906 that couples various system components including memory 904 to processor 902.

Processor 902 may be implemented as one or more processors. In an example, processor 902 is implemented as a central processing unit (CPU). Processor 902 may be implemented as one or more circuits capable of carrying out instructions contained in program code. The circuit may be an integrated circuit or embedded in an integrated circuit. Processor 902 may be implemented using a complex instruction set computer architecture (CISC), a reduced instruction set computer architecture (RISC), a vector processing architecture, or other known architectures and/or combinations thereof. Example processors include, but are not limited to, processors having an x86 type of architecture (IA-32, IA-64, etc.), Power Architecture, ARM processors, and the like.

Bus 906 represents one or more of any of a variety of communication bus structures. By way of example, and not limitation, bus 906 may be implemented as a Peripheral Component Interconnect Express (PCIe) bus. Data processing system 900 typically includes a variety of computer system readable media. Such media may include computer-readable volatile and non-volatile media and computer-readable removable and non-removable media.

Memory 904 can include computer-readable media in the form of volatile memory, such as random-access memory (RAM) 908 and/or cache memory 910. Data processing system 900 also can include other removable/non-removable, volatile/non-volatile computer storage media. By way of example, storage system 912 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 906 by one or more data media interfaces. Memory 904 is an example of at least one computer program product.

Memory 904 is capable of storing computer-readable program instructions that are executable by processor 902. For example, the computer-readable program instructions can include an operating system, one or more application programs, other program code, and program data. In one or more examples, memory 904 is capable of storing the executable software architecture illustrated in FIG. 6. Processor 902, in executing the computer-readable program instructions, is capable of performing the various operations described herein that are attributable to a computer. It should be appreciated that data items used, generated, and/or operated upon by data processing system 900 are functional data structures that impart functionality when employed by data processing system 900. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Data processing system 900 may include one or more Input/Output (I/O) interfaces 918 communicatively linked to bus 906. I/O interface(s) 918 allow data processing system 900 to communicate with one or more external devices and/or communicate over one or more networks such as a local area network (LAN), a wide area network (WAN), and/or a public network (e.g., the Internet). Examples of I/O interfaces 918 may include, but are not limited to, network cards, modems, network adapters, hardware controllers, etc. Examples of external devices also may include devices that allow a user to interact with data processing system 900 (e.g., display device 920, a keyboard, and/or a pointing device) and/or other devices such as accelerator card.

Data processing system 900 is only one example implementation. Data processing system 900 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

The example of FIG. 9 is not intended to suggest any limitation as to the scope of use or functionality of example implementations described herein. Data processing system 900 is an example of computer hardware that is capable of performing the various operations described within this disclosure. In this regard, data processing system 900 may include fewer components than shown or additional components not illustrated in FIG. 9 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer-readable storage medium" means a storage medium that contains or stores program instructions for use by or in connection with an instruction execution system, apparatus, or device. As defined herein, a "computer-readable storage medium" is not a transitory, propagating signal per se. A computer-readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer-readable storage media. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "real-time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer-readable storage medium (or media) having computer-readable program instructions thereon for causing a processor to carry out aspects of the inventive arrangements described herein. Within this disclosure, the term "program code" is used interchangeably with the term "program instructions"

and/or "computer-readable program instructions." Computer-readable program instructions described herein may be downloaded to respective computing/processing devices from a computer-readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer-readable program instructions may include state-setting data. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer-readable program instructions by utilizing state information of the computer-readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer-readable program instructions, e.g., program code.

These computer-readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the operations specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method, comprising:
using computer hardware, generating, in a memory of the computer hardware, a dataflow graph having nodes representing computation tasks of a computer program and edges representing channels linking the computation tasks, wherein the edges connect the nodes;
creating, in the memory, records associating source code representations of the computer program with the computation tasks;
determining, using the computer hardware, execution metrics of the computer program;
annotating the nodes of the dataflow graph with the source code representations and at least one of the edges or the nodes with the execution metrics;
displaying the dataflow graph on a display device as annotated;
in response to a user input, performing a refactoring action on the dataflow graph, wherein the refactoring action includes at least one of an operation including merging and serializing two or more selected nodes into a single node or another operation including splitting a selected node into two or more nodes;
generating updated execution metrics based on the refactoring action; and
displaying the updated execution metrics on the dataflow graph.

2. The method of claim 1, further comprising:
updating the dataflow graph responsive to the refactoring action resulting in an updated version of the dataflow graph; and
displaying the updated version of the dataflow graph.

3. The method of claim 1, wherein the execution metrics are determined, at least in part, by compiling and executing the computer program.

4. The method of claim 1, wherein the refactoring action includes at least one of a loop refactoring action or inlining a function call.

5. The method of claim 1, wherein the refactoring action includes at least one of removing a selected node from the dataflow graph or adding a new node to the dataflow graph.

6. The method of claim 1, further comprising:
sizing the nodes of the dataflow graph as displayed according to latencies of the computation tasks represented by the nodes.

7. The method of claim 1, further comprising:
displaying a first representation of an execution iteration of the computer program on a timeline; and
displaying a second representation of a next execution iteration of the computer program on the timeline, wherein the second representation is offset from the first representation by a distance corresponding to an iteration interval of the computer program.

8. The method of claim 1, further comprising:
creating a hierarchy in the dataflow graph by generating a sub-dataflow graph representing a selected computation task;
in response to a user input, performing a refactoring action on the sub-dataflow graph; and
displaying an updated version of the sub-dataflow graph in response to the performing the refactoring action.

9. The method of claim 1, further comprising:
distinguishing between synchronous channels and stream channels in the computer program; and
visually distinguishing edges that represent synchronous channels from edges that represent stream channels in the dataflow graph as displayed.

10. A system, comprising:
one or more processors configured to initiate operations including:
generating, in a memory coupled to the one or more processors, a dataflow graph having nodes representing computation tasks of a computer program and edges representing channels linking the computation tasks, wherein the edges connect the nodes;
determining execution metrics of the computer program;
creating, in the memory, records associating source code representations of the computer program with the computation tasks;
annotating the nodes of the dataflow graph with the source code representations and at least one of the edges or the nodes with the execution metrics;
displaying the dataflow graph on a display device as annotated;
in response to a user input, performing a refactoring action on the dataflow graph, wherein the refactoring action includes at least one of an operation including merging and serializing two or more selected nodes into a single node or another operation including splitting a selected node into two or more nodes;
generating updated execution metrics based on the refactoring action; and
displaying the updated execution metrics on the dataflow graph.

11. The system of claim 10, wherein the one or more processors are configured to initiate operations further comprising:
updating the dataflow graph responsive to the refactoring action resulting in an updated version of the dataflow graph; and
displaying the updated version of the dataflow graph.

12. The system of claim 10, wherein the execution metrics are determined, at least in part, by compiling and executing the computer program.

13. The system of claim 10, wherein the refactoring action includes at least one of removing a selected node from the dataflow graph or adding a new node to the dataflow graph.

14. The system of claim 10, wherein the one or more processors are configured to initiate operations further comprising:
sizing the nodes of the dataflow graph as displayed according to latencies of the computation tasks represented by the nodes.

15. The system of claim 10, wherein the one or more processors are configured to initiate operations further comprising:
displaying a first representation of an execution iteration of the computer program on a timeline; and
displaying a second representation of a next execution iteration of the computer program on the timeline, wherein the second representation is offset from the first representation by a distance corresponding to an iteration interval of the computer program.

16. The system of claim 10, wherein the one or more processors are configured to initiate operations further comprising:
creating a hierarchy in the dataflow graph by generating a sub-dataflow graph representing a selected computation task;
in response to a user input, performing a refactoring action on the sub-dataflow graph; and
displaying an updated version of the sub-dataflow graph in response to the performing the refactoring action.

17. The system of claim 10, wherein the one or more processors are configured to initiate operations further comprising:
distinguishing between synchronous channels and stream channels in the computer program; and
visually distinguishing edges that represent synchronous channels from edges that represent stream channels in the dataflow graph as displayed.

18. A computer program product, comprising:
one or more computer-readable storage media, and program instructions collectively stored on the one or more computer-readable storage media, wherein the program instructions are executable by computer hardware to initiate operations including:
generating, in a memory of the computer hardware, a dataflow graph having nodes representing computation tasks of a computer program and edges representing channels linking the computation tasks, wherein the edges connect the nodes;
determining execution metrics of the computer program;
creating, in the memory, records associating source code representations of the computer program with the computation tasks;
annotating the nodes of the dataflow graph with the source code representations and at least one of the edges or the nodes with the execution metrics;
displaying the dataflow graph on a display device as annotated;
in response to a user input, performing a refactoring action on the dataflow graph, wherein the refactoring action includes at least one of an operation including merging and serializing two or more selected nodes into a single node or another operation including splitting a selected node into two or more nodes;

generating updated execution metrics based on the refactoring action; and displaying the updated execution metrics on the dataflow graph.

\* \* \* \* \*